United States Patent
Devautour

(10) Patent No.: US 11,581,744 B2
(45) Date of Patent: Feb. 14, 2023

(54) ELECTRICAL ARCHITECTURE OF AN AIRCRAFT

(71) Applicant: THALES, Courbevoie (FR)

(72) Inventor: Joël Devautour, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/346,279

(22) Filed: Jun. 13, 2021

(65) Prior Publication Data

US 2021/0391727 A1    Dec. 16, 2021

(30) Foreign Application Priority Data

Jun. 16, 2020 (FR) ...................................... 2006263

(51) Int. Cl.
*H02J 4/00* (2006.01)
*B64C 25/40* (2006.01)

(52) U.S. Cl.
CPC .............. *H02J 4/00* (2013.01); *B64C 25/405* (2013.01); *B64D 2221/00* (2013.01); *H02J 2310/44* (2020.01)

(58) Field of Classification Search
CPC .......... H02J 1/102; H02J 2310/44; H02J 7/34; H02J 4/00; B64D 41/00; B64D 2221/00; B64D 45/00; B64C 25/405
See application file for complete search history.

(56) References Cited

U.S. PATENT DOCUMENTS

2016/0083106 A1* 3/2016 Lebrun ................ H02K 7/1823
322/8

FOREIGN PATENT DOCUMENTS

| EP | 2 801 719 A1 | 11/2014 | |
|---|---|---|---|
| EP | 3 499 254 A1 | 6/2019 | |
| WO | 2007/113312 A1 | 10/2007 | |
| WO | 2008/049886 A1 | 5/2008 | |
| WO | WO-2008049886 A1 * | 5/2008 | ................ H02J 3/02 |
| WO | 2009/125012 A2 | 10/2009 | |

* cited by examiner

*Primary Examiner* — Jared Fureman
*Assistant Examiner* — Duc M Pham
(74) *Attorney, Agent, or Firm* — BakerHostetler

(57) ABSTRACT

An electrical architecture of an aircraft includes a plurality of primary generators each associated with a propulsion engine of the aircraft, a plurality of primary electrical networks each associated with a primary generator in nominal operating mode, a single-part secondary electrical network, an electrical energy accumulation device connected directly to the secondary network, a first electrical energy converter arranged between the secondary electrical network and a first of the primary electrical networks, allowing energy to be transferred from the first of the primary electrical networks to the secondary electrical network, the first electrical energy converter being intended to supply electrical energy to the electrical energy accumulation device in nominal operating mode, a second electrical energy converter arranged between the secondary electrical network and a second of the primary electrical networks, allowing energy to be transferred from the secondary electrical network to the second of the primary electrical networks.

12 Claims, 4 Drawing Sheets

ELECTRICAL ARCHITECTURE OF AN AIRCRAFT

CROSS-REFERENCE TO RELATED APPLICATIONS

This application claims priority to foreign French patent application No. FR 2006263, filed on Jun. 16, 2020, the disclosure of which is incorporated by reference in its entirety.

FIELD OF THE INVENTION

The invention relates to improving the electrical architecture of an aircraft. On board a commercial aircraft, electrical energy is commonly generated by primary generators that are coupled mechanically to the propulsion engines of the aircraft. Each generator supplies an AC voltage that is supplied to an electrical network of the aircraft, which distributes the AC or DC electrical energy required to operate electrical loads located in the fuselage area and in the engine area.

BACKGROUND

Conventionally, electricity may be generated on commercial aircraft with a fixed-frequency AC current, conventionally at 400 Hz, based on gas turbines that rotate at a variable speed. The nominal voltage of on-board AC networks is generally 115 V. On some modern aircraft, this voltage has been raised to 230 V. To achieve this, a speed control system is installed between the shaft of the gas turbine and an alternator, which is then able to rotate at a fixed speed so as to generate the desired fixed frequency. A speed control system implementing a hydraulic converter is known in the literature by the name CSD for: "Constant Speed Drive". The generator and the hydraulic converter may be integrated so as to form a device known in the literature by the name IDG for: "Integrated Drive Generator". Attempts have been made more recently to dispense with these hydraulic converters by moving towards variable-speed alternators, and therefore to generate variable-frequency on-board networks, for example at between 400 and 800 Hz.

On board long-range aircraft, there are commonly other electric generators, notably an auxiliary power unit and a ram air turbine.

The auxiliary power unit is known in the literature and hereinafter referred to by its acronym APU. The APU is an auxiliary unit generally comprising a gas turbine coupled to an electric generator. The APU is generally located in the tail cone of the aircraft and is supplied with kerosene from the fuel tanks of the aircraft. The APU is started by a battery of the aircraft. The APU is intended to produce air for the air-conditioning system of the aircraft and to start the propulsion engines when these are equipped with air starting systems. The APU may also produce hydraulic and/or electrical energy so as to supply power to the various on-board systems on the ground when the propulsion engines are at a standstill and to start these engines when they are equipped with electrical starters. The APU may also be used in flight in the event of a fault with the primary generators.

The ram air turbine is known in the literature and hereinafter referred to by its acronym RAT. The RAT is formed by an air turbine arranged in a bay of the aircraft. The RAT is deployed in flight in the event of loss of the primary electrical energy sources of the aircraft, which are the primary generators coupled to the propulsion engines and APU. The RAT is driven by the airflow generated by the progression of the aircraft. The RAT is coupled to a hydraulic pump or to an alternator. The RAT is used as a backup energy source on aircraft.

The APU and the RAT represent a significant mass carried on board the aircraft. The APU and the RAT are of no use in the primary flight phases. In addition, the APU is becoming increasingly less used when the aircraft is parked on the ground in order to avoid pollution risks. Some airports even stipulate the use of air and electricity servitudes that are made available.

On the ground, the aircraft may also be supplied with power by an external generator often called a ground supply unit, which makes it possible not to use the APU.

The various electric generators are connected to an electrical power distribution system, known in the literature and hereinafter denoted by its acronym EPDS. The EPDS itself consists of primary and secondary electrical cores. The primary electrical cores comprise electrical distribution bars that are segregated from one another during nominal operation. It is possible to interconnect the electrical bars in the event of loss of one or more generators. The electrical bars are not all at the same voltage. They are connected to one another by power converters that make it possible to create the various voltage and frequency levels required for the operation of various loads. The secondary electrical cores control and protect the electrical loads of the aircraft.

The EPDS makes it possible to create the various voltages required for the operation of an aircraft, such as for example a fixed-frequency or variable-frequency voltage of 115 VAC or 230 VAC, or else a controlled voltage of 28 VDC intended for low-power loads, such as the avionic systems or the flight control computers.

The EPDS also makes it possible to separate what are called "essential" loads from those that are "non-essential" on separate electrical distribution bars. An essential load is understood to mean any load essential to ensuring correct operation of the aircraft in the event of a fault. Supplying power to the essential loads makes it possible to ensure fully safe operational continuity for the aircraft and its passengers.

On board modern aircraft, it is possible to find a high-voltage direct-current network, known in the literature and hereinafter denoted by its acronym HVDC. The EPDS is able to generate the HVDC voltage that is obtained by rectifying a regulated three-phase AC voltage produced by the primary generators. One HVDC voltage that is commonly used is 540 VDC. Voltages of 350 V and 270 V are also contemplated. The main reason for the development of HVDC networks is their usefulness for supplying power to certain loads and notably synchronous motors or actuators that are not able to operate without a DC-to-AC power converter. This converter is then supplied with power by an HVDC network.

In the commercial aeronautical field, the current trend is to increase the number of electrical devices. Some hydraulic apparatuses are being replaced with electrical systems, such as the flight controls. Moreover, the air conditioning in the cabin is also tending to become electrical.

Since the proportion of loads requiring a DC network for their power supply is tending to increase significantly within the trend for the electrification of aircraft, some aircraft manufacturers are already considering abandoning primary AC networks so as to implement electrical distribution systems that would be mostly HVDC. A standard is currently being developed for a future fully HVDC network. In the same way as for AC networks, HVDC networks have to be regulated in a highly precise manner.

With the implementation of an HVDC network, each of the conventional generators described above is associated with an AC-to-DC converter that makes it possible to change from the AC voltage coming from the generator to the DC voltage of the HVDC network. A high-voltage battery is connected to the HVDC network by way of a DC-to-DC converter, which makes it possible to match the voltage of the battery (which is variable by nature and depends on its state of charge) and the fixed and regulated voltage of the HVDC network.

AC networks have numerous drawbacks. First of all, modern primary AC generators are driven by the propulsion engines of the aircraft and therefore cannot be connected in parallel since it is impossible to synchronize them, except by implementing speed control systems by way of a hydraulic converter of CSD type.

The dimensioning of the primary generators and of the associated AC networks takes into account possible fault cases with the propulsion engines. Overdimensioning the generators means that they are underused. For example, for an aircraft comprising two engines and two generators per engine, in the cruising phase of a flight, the primary generators are used to the order of 30% of their nominal capacity. The mass of the generators and of the wiring associated with each of the generators is proportional to the installed power allowing the generators to have their nominal capacity. In other words, electrical generation is highly detrimental in terms of on-board mass.

Likewise, the presence of the RAT, which is used only as backup, is also detrimental to the on-board mass. It has a very low power density, of the order of 0.3 kW/kg. In addition, the RAT does not address all cases of operation in backup mode. For example, when the aircraft is at a low speed, for example in the approach phase and in the landing phase, the RAT is no longer able to provide its backup function due to the excessively low speed of the aircraft. Moreover, in the event of losing both propulsion engines and of deploying the RAT, electricity generation is interrupted for the time it takes to deploy the RAT and to start its generator. Using the RAT requires hydraulic and electrical energy reserves, such as batteries that allow the hydraulic and electrical systems essential to flight safety to operate, notably to supply power to the brakes of the aircraft.

The presence of the APU is also detrimental to the on-board mass of the aircraft. The APU is used above all on the ground before the starting of the propulsion engines driving the primary generators. The APU uses kerosene and is highly polluting. In some airports equipped with services for supplying power on the ground, the use of the APU is subject to strict regulations or even prohibited, thereby making its usefulness on board an aircraft highly questionable. The installation of the on-board APU is justified only for critical phases such as the loss of both engines in flight, which may happen for example in the case of a bird strike in both engines at the same time when the aircraft takes off. Since the RAT makes it possible to supply power to only a very limited number of devices, the rapid starting of the APU in this extreme case makes it possible to keep more devices in operation, improving comfort for the pilots so as to return the aircraft to the ground in full safety in comparison with RAT-based or battery-based operation. Some aircraft manufacturers are also working on replacing the APU with systems that do not emit $CO_2$ and toxic gases, such as fuel cells supplied with hydrogen that is produced through electrolysis. However, this solution has struggled to become established since it is still necessary to overcome problems linked to the installation of such devices in aircraft and to the absence of a "dedicated" hydrogen production and distribution circuit. Specifically, at present, the majority of hydrogen is produced from oil-based products.

With regard to the EPDS, the voltages that it delivers have to meet highly stringent aeronautical standards. These standards define the voltage levels and frequencies to be complied with, regardless of the mode of operation. These standards notably require regulating the voltages in a highly precise manner. In the case of an aircraft implementing 400 Hz fixed-frequency networks, the frequency regulation is of the order of one Hz. For the 115 VAC and 230 VAC voltages coming from the electric generators, the voltage regulation is performed by way of a control module associated with each of the electric generators and known in the literature by the name GCU for: "Generator Control Unit". In the case of fixed-frequency networks using an IDG, the precise regulation requires an extremely precise and therefore expensive CDS.

The loads supplied with the voltages delivered by the EPDS also have to comply with precise rules. The harmonic rejection rate notably has to remain below a standardized template. Since this template is extremely constrictive, the presence of filters associated with each load and ensuring that the network is compatible with the load to which it supplies power is obligatory. The tight tolerances tend to make these filters more complicated and heavier. In some cases, a filter may be as heavy as its associated load.

Lastly, the standards that the networks have to comply with do not allow the loads supplied with power by these networks to return energy to the electrical network. It is therefore impossible to consider recovering lost energy on the increasingly numerous reversible loads, such as motors and engines. At present, each reversibly operating load has to carry, in its associated converter, on-board devices for passively dissipating regenerated energy.

HVDC networks also have numerous drawbacks. HVDC networks address a certain number of drawbacks of AC networks, in particular by allowing the generators to be placed in parallel. This placing in parallel makes it possible to improve the usage rate of the generators in the cruising phase, and therefore to reduce the ratio between the installed electrical power and the nominal power consumed by the aircraft.

However, the rotating generators, which remain AC, and the implementation of HVDC networks requires rectifying the three-phase AC voltage of the generators and therefore carrying additional on-board converters to rectify the voltage of the generators.

In addition, since the majority of on-board loads operate with an AC voltage, it is necessary to convert the HVDC voltage back into an AC voltage able to be used by the loads, hence the presence of a very large number of DC-to-AC converters. All of these converters, given the increasingly high on-board powers, require the addition of air-cooling systems or liquid loops, thereby further exacerbating the mass balance of the aircraft. Lastly, the addition of these numerous converters tends to worsen the reliability and the availability of the aircraft's electrical systems, in comparison with AC electrical architectures that, although less sophisticated, are also more reliable.

Patent application WO 2007/113312 filed in the name of the Applicant proposes to optimize the overall mass of the converters by pooling them. Specifically, on board an aircraft, some dedicated converters are used only for short periods, and it is therefore advantageous to pool the use thereof. However, this pooling also poses problems linked to certification, since it is necessary to demonstrate that the pooling does not affect the safety of the aircraft systems. This constraint is stated notably in the D0297 standard. In addition, pooling requires additional systems such as arrays of contactors, worsening the on-board mass balance.

In the same way as for AC networks, the standards governing HVDC networks are also highly stringent. The loads connected to these networks have to incorporate filters that avoid returning interference thereto. Again in the same way as for AC networks, the loads must not return energy thereto. The regenerative loads therefore have to be equipped with means for dissipating regenerated energy.

SUMMARY OF THE INVENTION

The invention aims to overcome all or some of the problems cited above by proposing a novel electrical architecture comprising an unregulated secondary electrical network capable of receiving energy from any type of device, from the primary generators and also from regenerative loads. This secondary electrical network also allows the temporary storage of energy. The secondary electrical network serves as a buffer for storing energy therein, notably resulting from the overdimensioning of the primary generators, and allowing the primary networks to be supplied with power during certain consumption peaks.

To this end, the subject of the invention is an electrical architecture of an aircraft comprising:

a plurality of primary generators each associated with a propulsion engine of the aircraft, each of the primary generators being configured so as to deliver a nominal power, a plurality of primary electrical networks each associated with a primary generator in nominal operating mode and operating at a first nominal voltage, a single-part secondary electrical network operating in a voltage range whose minimum value is at least equal to twice the value of the first nominal voltage, an electrical energy accumulation device connected directly to the secondary network, a first electrical energy converter arranged between the secondary electrical network and a first of the primary electrical networks, allowing energy to be transferred from the first of the primary electrical networks to the secondary electrical network, the first electrical energy converter being intended to supply electrical energy to the electrical energy accumulation device in nominal operating mode, a second electrical energy converter arranged between the secondary electrical network and a second of the primary electrical networks, allowing energy to be transferred, in nominal operating mode, from the secondary electrical network to the second of the primary electrical networks, the electrical energy accumulation device and the second electrical energy converter being configured so as to allow the second of the primary electrical networks to be supplied with a power at least equal to half the nominal power of one of the primary generators.

The electrical architecture may furthermore comprise:

at least one regulated low-voltage DC network whose nominal voltage is substantially between 24 and 30 V, the low-voltage DC network being separate from the single-part secondary electrical network, at least one battery connected to the low-voltage DC network, a third electrical energy converter for supplying power to the low-voltage DC network from one of the primary electrical networks, a fourth electrical energy converter for supplying power to one of the primary electrical networks to which the essential loads of the aircraft are connected.

The primary electrical networks may be regulated and the secondary electrical network is advantageously a DC voltage network whose voltage is set by the electrical energy accumulation device.

The single-part secondary electrical network may be configured so as to operate, in nominal operating mode, at its nominal voltage whose value may vary within a ratio from 1 to 3.

The first electrical energy converter advantageously has a nominal power lower than the nominal power of the second electrical energy converter.

A regenerative load may be connected to the secondary electrical network by way of a bidirectional converter without passing via one of the primary electrical networks.

At least one electric generator unit independent of any propulsion engine of the aircraft may be connected to the secondary electrical network without passing via one of the primary electrical networks.

A domestic cabin electrical network may be connected to the secondary electrical network by way of a third electrical energy converter without passing via one of the primary electrical networks.

The electrical architecture may comprise an essential electrical network for supplying power to the essential loads of the aircraft, the second electrical energy converter being able to supply power to the essential electrical network.

The electrical architecture may comprise an electrical power distribution system and a control module for controlling the secondary electrical network, exchanging information in order to drive the electrical energy converters.

The first and second electrical energy converters advantageously each comprise a transformer having reinforced insulation.

The second electrical energy converter is advantageously connected to the second primary electrical network through a semiconductor-based electronic switch, allowing the single-part secondary electrical network to supply a short-circuit current to a load connected to the second primary electrical network.

BRIEF DESCRIPTION OF THE DRAWING

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION OF THE PREFERRED EMBODIMENT

Figure 1:
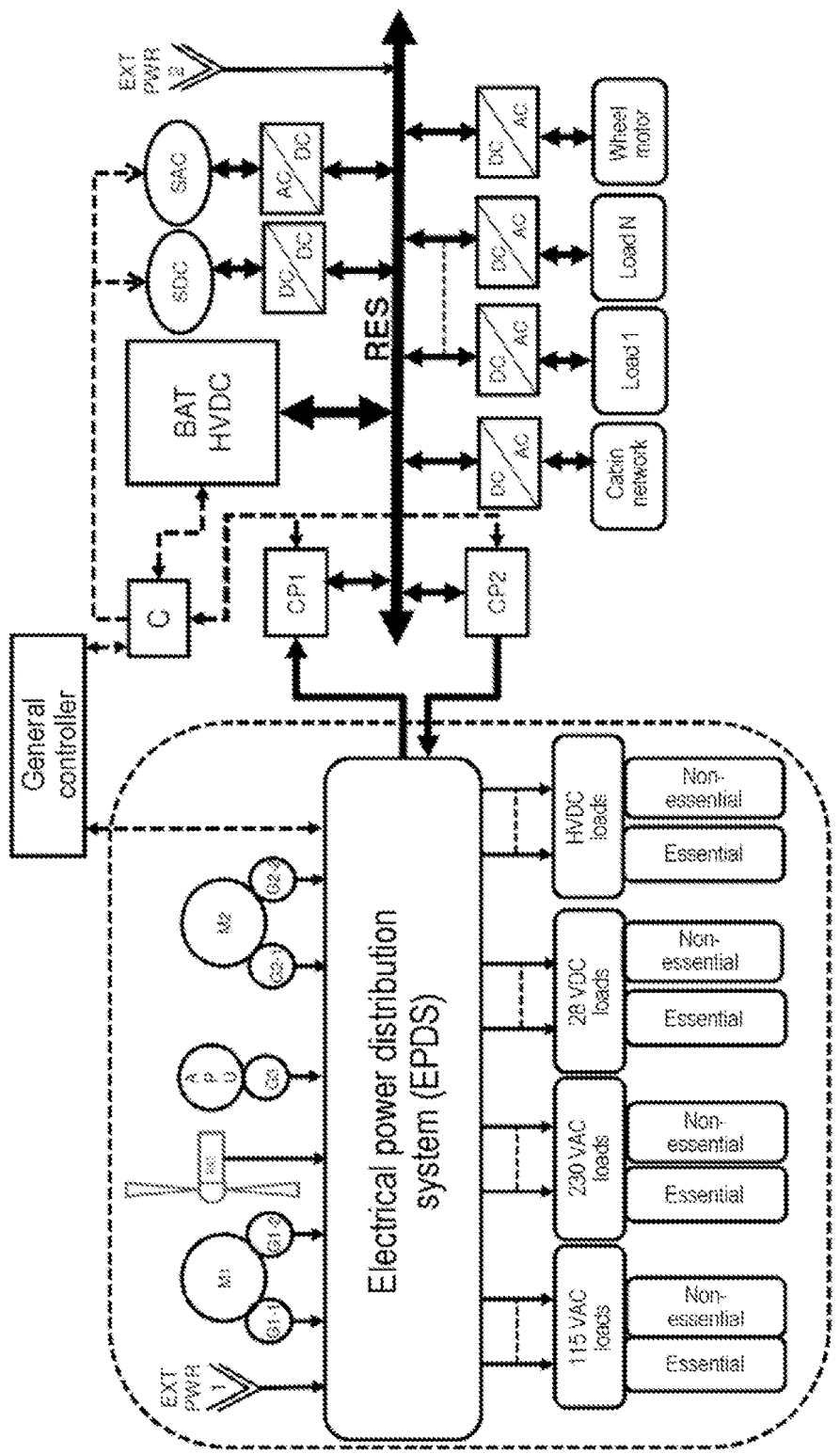
FIG. 1 schematically shows one example of an electrical architecture according to the invention adapted for a commercial aircraft.

FIG. 1 shows one example of an electrical architecture according to the invention. FIG. 1 shows an electrical architecture of a twin-engine commercial aircraft. Each of the propulsion engines M1 and M2 drives two electric generators: G1.1 and G1.2 for the engine M1 and G2.1 and G2.2 for the engine M2. The invention may be implemented regardless of the number of propulsion engines and regardless of the number of electric generators per engine. The invention may be implemented for other types of aircraft, and for example for rotary-wing aircraft.

In the example shown, other electric generators, such as a generator G3 driven by an APU and a RAT, are present in the aircraft. These auxiliary (APU) and backup (RAT) generators are not mandatory in the invention, as will be seen further below. The electrical architecture comprises an electrical power distribution system EPDS receiving electrical energy from all of these generators. A network, also called primary network, is associated with each generator, notably the generators associated with the propulsion engines and called primary generators. The primary networks, not shown in FIG. 1, belong to the EPDS. The EPDS in turn distributes the energy that it receives to various loads of the aircraft. In FIG. 1, the loads have been grouped together by type of network supplying power to them: 115 VAC loads, 230 VAC loads, 28 VDC loads and loads supplied with a high-voltage direct current HVDC. These four types of load are given only by way of example. The invention may be implemented regardless of the number of different network types. Some aircraft might be equipped with only one type of network. In addition, the AC networks may be fixed-frequency, for example 400 Hz, or variable-frequency, for example between 400 Hz and 800 Hz. Among the loads, some of them are deemed essential or critical, and others non-essential. The essential loads comprise any load essential to ensuring correct operation of the aircraft in the event of a fault. The essential loads notably include certain computers and flight controls. The non-essential loads notably include what are called commercial loads that allow a service to be provided to the passengers on board the passenger cabin. The non-essential loads may be shed if necessary.

Many airports allow aircraft to connect to a ground supply unit that generally delivers a voltage of 115 V 400 Hz. The architecture comprises an outlet EXT PWR 1 for connecting the EPDS to the ground supply unit. Modern aircraft equipped with 230 V 400 Hz primary networks have to carry an on-board converter for transforming the voltage from 115 V to 230 V. This converter constitutes a needless mass in flight.

The generators, the EPDS and the loads are commonly carried on board in an aircraft not implementing the invention. This structure is retained in the invention.

According to the invention, the electrical architecture comprises a secondary electrical network RES that complements the primary electrical networks of the aircraft. The primary electrical networks are supplied with power directly by the primary generators of the aircraft. The secondary electrical network RES is said to be single-part. More precisely, the secondary electrical network RES does not comprise any contactors for dissociating the parts thereof. The secondary electrical network RES is formed by a single-part distribution bar or busbar. The secondary electrical network RES is considered to be a non-reconfigurable and unbreakable electrical node. The devices connected to this network may be disconnected in the event of a fault.

In the example shown in FIG. 1, the secondary electrical network RES is a high-voltage direct current HVDC network. It is also possible to implement the invention with an AC voltage secondary electrical network.

The electrical architecture comprises an electrical energy accumulation device BAT-HVDC. Any type of electrical energy accumulation device may be implemented in the context of the invention. Accumulator batteries able to store energy in chemical form and output it in electrical form are of course possible. It is also possible, instead of or in addition to the battery, to implement any device capable of storing energy in any physical form, notably electrical, mechanical, thermal, and to output it in electrical form, such as for example a supercapacitor or a flywheel. It is possible to implement an electrical energy accumulation device that accumulates and delivers energy in the form of an AC voltage. This type of electrical energy accumulation device is suitable for an AC voltage secondary electrical network.

The electrical energy accumulation device BAT-HVDC is connected directly to the secondary network without an electrical energy converter and without passing via one of the primary electrical networks. In other words, it is the voltage of the electrical energy accumulation device BAT-HVDC that imposes that of the secondary electrical network RES. In a regulated conventional HVDC network, it is impossible to connect a battery directly to this network. Specifically, the voltage of the battery fluctuates to a large extent, primarily depending on its state of charge. An energy converter has to be arranged between the battery and the conventional network, notably in order to match the voltage level. By way of example, the voltage of a lithium-ion HVDC battery may typically vary by several hundred volts during operation, for example between 230 V and 500 V depending on its state of charge. Typically, for aircraft equipped with 115 VAC three-phase networks, the minimum operating voltage of the secondary electrical network RES is 230 V, and for aircraft equipped with 230 VAC three-phase networks, the minimum operating voltage of the secondary electrical network RES is 460 V. More generally, the minimum operating voltage during nominal operating mode of the secondary electrical network RES is advantageously at least equal to twice the value of the nominal voltage of the networks AC1 and AC2. The conventional networks implemented in commercial aircraft are regulated. The voltage variations permitted in these networks are of the order of one volt. By contrast, for the secondary electrical network RES, no specific regulation is performed within a range in which the voltage of the electrical energy accumulation device BAT-HVDC is able to evolve during normal operation. The voltage range of the secondary electrical network RES is limited simply so as to avoid excessively deep discharging or unacceptable overcharging of the electrical energy accumulation device BAT-HVDC. It is possible for example to configure the secondary electrical network RES so as to authorize a variation in its operating voltage in nominal operating mode, that is to say without any faults, within a ratio from 1 to 3.

The secondary electrical network RES may exchange energy with the EPDS. To this end, the architecture comprises two electrical energy converters CP1 and CP2 arranged between the secondary electrical network RES and the EPDS. The converter CP1 is configured so as to transfer energy from one of the primary electrical networks to the secondary electrical network RES in nominal operating mode, and the converter CP2 is configured so as to transfer energy from the secondary electrical network RES to another of the primary electrical networks. The two converters are separate and are able to operate simultaneously. One of the primary networks may supply energy to the secondary electrical network RES, notably when the primary generator associated with this primary network is underused. During the flight of the aircraft, in cruising phase and during nominal operation, the primary generators are underused, and this means that there is almost always an available generation power for supplying energy to the secondary electrical network RES and therefore for virtually continuously recharging an electrical energy accumulation device BAT-HVDC. Nominal operating mode is understood to mean operation of the aircraft in its cruising flight phases without any faults. Each of the generators G1.1, G1.2, G2.1, G2.2 and G3 has the possibility of supplying energy to the secondary electrical network RES. A set of contactors, one example of which is given further below, makes it possible to connect one of the generators to the secondary electrical network RES. Another of the primary networks may receive energy from the secondary electrical network RES, for example in the event of a consumption peak of the loads associated with this other primary network, consumption peaks being able to occur in nominal operating mode.

It is possible, in the electrical architecture, to provide a plurality of secondary electrical networks RES each connected to an electrical energy accumulation device BAT-HVDC and to two converters CP1 and CP2.

The architecture comprises a control module C for controlling the secondary electrical network RES. The control module C drives the converters CP1 and CP2 as well as the electrical energy accumulation device BAT-HVDC. The electrical architecture may also comprise a general controller for controlling the whole electrical architecture of the aircraft. The general controller drives both the EPDS and the control module C. The control module C and the general controller may be physically grouped together within one and the same computer. As an alternative, for safety reasons, it may be advantageous to segregate the functions of the control module C and of the general controller, for example so as to allow the EPDS and the secondary electrical network RES to be completely decoupled.

If the electrical energy accumulation device BAT-HVDC is an accumulator battery, the operation of the converter CP1 may be very close to that of a battery charger adapted to the technology of the battery. The converter CP1 may comprise one or more contactors at input on the side of the EPDS for choosing the generator to which the converter CP1 is connected. The converter CP1 furthermore comprises a rectifier transformer, formed for example by a transformer with isolation between primary and secondary, by a diode-based electronic rectifier and by a current regulator for regulating the current on the output side of the secondary electrical network RES. In order to ensure sufficient segregation of the secondary electrical network RES and the EPDS, the transformer may have reinforced insulation in order to avoid unwanted propagation between the regulated voltage of the primary network and the unregulated voltage of the secondary electrical network RES. The transformer may have detection means for detecting the loss of isolation between primary and secondary, as described for example in patent application EP 3 499 254 A1 filed in the name of the Applicant. The detection of loss of isolation may then act on the contactors located at the input of the converter CP1. For availability purposes, the converter CP1 may have a redundant architecture. Other embodiments of the converter CP1 are of course possible in the context of the invention.

The converter CP2 is adapted to the voltage of the secondary electrical network RES and to the one or more voltages of the one or more primary networks to which the secondary electrical network RES is liable to supply energy. The voltage of the secondary electrical network RES may be AC or DC, as may the one or more voltages of the one or more primary networks.

The converter CP2 may comprise one or more contactors at output on the side of the EPDS for choosing the primary network to which the converter CP2 is connected. The converter CP2 may comprise an electronic inverter stage that makes it possible, from the voltage of the secondary electrical network RES, to create a voltage compatible with the voltage of the network to which the converter CP2 is connected. A compatible voltage is understood primarily to mean a voltage of the same amplitude, the same frequency, synchronized in terms of phase and complying with the standards imposed for the primary generators. The converter CP2 may comprise, at output, an isolating transformer allowing complete segregation between the secondary electrical network RES and the EPDS. In the same way as for the converter CP1, the transformer of the converter CP2 may have reinforced insulation and detection means for detecting the loss of isolation between primary and secondary. For availability purposes, the converter CP2 has an architecture that is advantageously redundant. In the same way as for the converter CP1, other embodiment types may be contemplated for the converter CP2.

For example, when the EPDS comprises one or more AC networks, it is advantageous to choose an electrical energy accumulation device BAT-HVDC with a nominal voltage equal to a voltage rectified directly from the AC network in order to avoid using a voltage booster for the converter CP1. For example, based on a 115 VAC three-phase network, it is possible to choose an electrical energy accumulation device BAT-HVDC with a nominal voltage equal to 270 VDC and 540 VDC for a 230 VAC three-phase network.

Since the energy transfer through the converter CP1, from one of the networks of the EPDS to the secondary electrical network RES, is able to be carried out for a large portion of the duration of a flight and notably throughout the entire cruising phase, the converter CP1 may have a lower nominal power than the converter CP2, which may be called on to supply energy to a greater extent for these short durations. For example, in a conventional architecture, the primary generators are dimensioned so as to allow energy to be produced in events of faults, such as for example a short circuit occurring on a load. Between the time when the short circuit occurs and the time when protection is tripped so as to isolate the short-circuited device, the associated generator has to be able to supply this short-circuit current. By implementing the invention, it is possible to momentarily supply the short-circuit current by way of the secondary electrical network RES in addition to the primary generator associated with the defective device. When energy is additionally supplied by the secondary electrical network RES, the converter CP2 is synchronized with the generator that it supports. In other words, implementing the invention makes it possible to limit the overdimensioning of the primary generators by using the secondary electrical network RES for some electrical consumption peaks. These peaks use the converter CP2, which is then dimensioned for this purpose, with for example a nominal power greater than that of the converter CP1.

Apart from supplying power to the loads of the aircraft during consumption peaks, the energy of the secondary electrical network RES may be used for other purposes.

In the event of a fault with one or more primary generators, for example in the event of loss of one or both propulsion engines of the aircraft, seen from the EPDS, the converter CP2 is substituted in for one or more faulty generators. In a manner intermediate between nominal operation and complete loss of one or more generators, the secondary electrical network RES may mitigate momentary heating of a primary generator or a risk of pumping of the engine driving the primary generator. The risk of pumping occurs notably when the engine is idling, with the majority of the mechanical power that it delivers being used for electrical generation. Temporal variations in electrical consumption occur on a frequent basis. A sharp variation in electrical consumption may lead to jumping of the speed of the engine, or even to jamming thereof. More generally, the secondary electrical network RES makes it possible, partially or in full and in a one-off manner, to shed one of the generators of the primary distribution network by supplying the additional power required.

It is possible to connect some loads of the aircraft, referenced "load 1" to "load N" in FIG. 1, to the secondary electrical network RES without passing via the primary networks. It is beneficial notably to connect loads able to regenerate energy, such as for example electric motors, such as for example electric thrust inverters or electric wheel motors. Connecting this type of load to the secondary electrical network RES allows the loads to supply the regenerated energy to the secondary electrical network RES. This energy may recharge the electrical energy accumulation device BAT-HVDC or transit via the converter CP2 so as to supply power to other loads of the aircraft. In contrast to the primary networks, which do not allow regenerated energy to be used, implementing an unregulated secondary electrical network RES easily allows energy to be recovered.

The loads shown in FIG. 1 may include notably a cabin network. This is a network made available notably to passengers, for example to recharge their portable electronic appliances, telephones or computers. The network implements what are called domestic voltages commonly used in the home, for example 220 V 50 or 60 Hz. Such a network also allows oven devices to be connected in order to heat meals served on board. Such devices supplied with a domestic voltage are much less heavy than devices specifically adapted to voltages carried by the primary networks of the aircraft. The cabin network is advantageously supplied with power by the secondary electrical network RES without passing via the primary networks. Supplying power to the cabin network via the secondary electrical network RES makes it possible notably to avoid momentary outages when the primary networks change generator, this being the case notably when transferring the generation of power from the APU to a primary generator.

Electric wheel motors may also be supplied with power by the secondary electrical network RES without passing via the primary networks. The wheel motors of the aircraft allow it to move in e-taxi mode.

In general, in an aircraft having primary AC networks and without a secondary electrical network RES, the majority of the AC loads require a rectifier followed by an inverter for their power supply. The rectifier, often designated by the acronym ATRU for auto-transformer rectifier unit, has to be able to convey all of the instantaneous power required for the operation of the loads that are connected thereto, thereby increasing the mass of the aircraft. Supplying power to these loads by way of a secondary electrical network RES operating in DC current mode makes it possible to dispense with an ATRU, which is also bulky. The rectifier function is then provided by the converter CP1, which is dimensioned on the basis of the average power consumed, and not on the basis of the maximum power consumed by the loads, the electrical energy accumulation device BAT-HVDC supplying power to the loads during their consumption peaks.

For an electrical architecture incorporating a secondary electrical network RES at its design stage, the invention makes it possible to dimension the primary generators on the basis of the average power consumed by all of the loads of the aircraft and of a power required to charge the electrical energy accumulation device BAT-HVDC. It is not necessary to dimension the primary generators on the basis of the maximum power consumed by the loads, notably during consumption peaks. The electrical energy accumulation device BAT-HVDC and the converter CP2 are for their part dimensioned so as to supply power to the primary networks during consumption peaks in addition to the power delivered by the primary generators. It is also possible to implement the invention in an existing electrical architecture in which the primary generators have been dimensioned so as to cover consumption peaks. Without changing the existing generators, modifying an existing electrical architecture by integrating a secondary electrical network RES and an electrical energy accumulation device BAT-HVDC into it makes it possible to easily add additional functions, such as notably the e-taxi function, the cabin network, the recovery of energy from loads able to regenerate energy and the transfer of the supply of power of a load from one generator to another without any outage, as has been seen above.

It is possible to connect electric generators, referenced SDC and SAC in FIG. 1, to the secondary electrical network RES. The generators SDC and SAC are connected to the secondary electrical network RES by way of specific converters, without passing via the primary networks. The generator SDC supplies a DC voltage and is connected to the secondary electrical network RES by way of a DC-to-DC converter. This converter is necessary because the voltage of the secondary electrical network RES is imposed by the electrical energy accumulation device BAT-HVDC. The DC-to-DC converter makes it possible to match the output voltage of the generator SDC to the voltage of the secondary electrical network RES. The generator SAC supplies a single-phase or polyphase AC voltage and is connected to the secondary electrical network RES by way of an AC-to-DC converter. The generators SDC and SAC are driven by the control module C. Any type of electric generator may be connected to the secondary electrical network RES. The generators may be electric machines driven by combustion engines. Other types of generator, based notably on renewable energies such as fuel cells or photovoltaic panels, may be connected to the secondary electrical network RES. It is advantageous to connect generators independent of the propulsion engines of the aircraft to the secondary electrical network RES.

The secondary electrical network RES may additionally receive energy through a ground supply outlet EXT PWR 2 adapted to a ground supply unit present at airports. The ground supply outlet EXT PWR 2 is connected to the secondary electrical network RES without passing via one of the primary networks of the aircraft. Connection to a ground supply unit via the outlet EXT PWR 2 makes it possible for example to quickly recharge the electrical energy accumulation device BAT-HVDC during a stopover of the aircraft. By implementing a secondary electrical network RES with an AC voltage of 115 V 400 Hz, it is possible to use ground supply units that are nowadays commonly installed. For HVDC secondary electrical networks RES, it would be possible to provide ground supply units adapted to this HVDC voltage.

It is possible to connect generators that are already present in the aircraft, such as the APU and the RAT, directly to the secondary electrical network RES, without connecting them directly to the primary networks. Specifically, during nominal operation, the APU and the RAT are rarely used. The APU is practically used only on the ground, and the RAT is used only as backup. By connecting them to the secondary electrical network RES, it would be possible to use them, notably for the APU, in a more rational manner, notably to recharge the electrical energy accumulation device BAT-HVDC during certain flight phases. If the state of charge of the electrical energy accumulation device BAT-HVDC allows, the electrical functions performed by the APU on the ground and by the RAT as backup could be provided by the electrical energy accumulation device BAT-HVDC through the secondary electrical network RES. Implementing the invention therefore makes it possible to dispense with the electric generators of the RAT and of the APU or at least one of the two.

The generators connected to the secondary electrical network RES behave as current sources that inject current into the electrical energy accumulation device BAT-HVDC. The loads connected to the secondary electrical network RES also behave as current sources that extract power from the electrical energy accumulation device BAT-HVDC.

The control module C for controlling the secondary electrical network RES, through the general controller, recovers information from the EPDS on a secure communication bus. This information includes inter alia information useful for managing the secondary electrical network RES, for example information about the capacity and the availability of the various generators connected to the EPDS, or else the configuration state of the various elements of the EDPS through the state of the various contactors of the EPDS.

The communication bus may exchange other information useful for the operation of the secondary electrical network RES, such as the voltage and frequency characteristics of the outputs of the generators connected to the EPDS, so as to allow the converter CP2 to inject the correct voltage in terms of amplitude, frequency and phase into the regulated distribution network of the EPDS to which it is connected. Through this communication bus, the general controller is able to ask the EPDS to modify its configuration, and notably the state of the contactors belonging to the EPDS.

The control module C communicates with the electrical energy accumulation device BAT-HVDC through a communication bus in order to ascertain its state of charge (SOC) and state of health (SOH). The control module C also communicates with the converters CP1 and CP2 in order to exchange power and voltage setpoints through another communication bus.

When electric generators, notably the generators SDC and SAC, and when loads are connected to the secondary electrical network RES without passing via the primary networks of the aircraft, the control module C is able to communicate with these various devices through a communication bus.

The control module C and the general controller may be implemented by way of modular computers commonly used in the aeronautical sector. This type of computer is known in the literature as "Integrated Modular Avionics" or IMA in acronym form. Other control architectures for controlling the secondary electrical network RES and the devices connected thereto may be implemented within the context of the invention.

Figure 2:
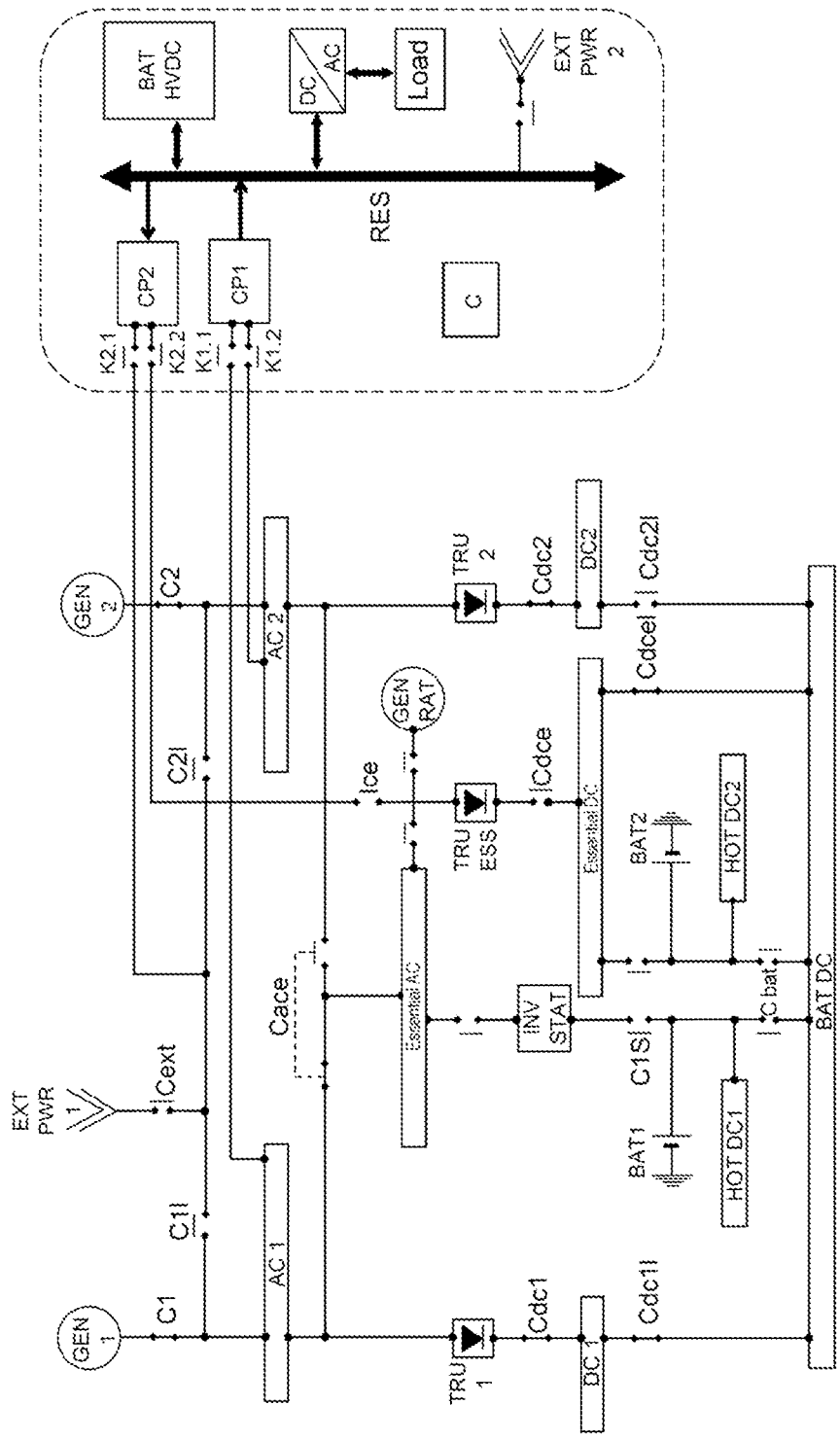
FIG. 2 shows a more precise example of an electrical architecture according to the invention adapted for primary AC networks.

FIG. 2 shows one example of an electrical architecture according to the invention adapted to the presence of two regulated-voltage primary AC networks AC1 and AC2. The architecture comprises two primary generators GEN1 and GEN2. The architecture may also be supplied with power by a ground supply unit whose outlet is referenced EXT PWR 1. In nominal operating mode, the generator GEN1 supplies power to the network AC1 via the contactor C1 and the generator GEN2 supplies power to the network AC2 via the contactor C2. The ground supply outlet EXT PWR 1 may be connected to the network AC1 via the contactors Cext and C1*l* and may be connected to the network AC2 via the contactors Cext and C2*l*. A network Essential AC is supplied with power either by the network AC1 or by the network AC2 through a set of contactors Cace. The network Essential AC makes it possible notably to supply power to the essential loads requiring an AC supply voltage. In flight, in the event of loss of both primary generators, GEN1 and GEN2, the network Essential AC is supplied with power by the ram air turbine RAT.

The electrical architecture of FIG. 2 also contains a plurality of regulated low-voltage DC networks whose nominal voltage is 28 V. In practice, the voltage regulation allows the nominal voltage of these networks to vary substantially between 24 and 30 V. Commercial aircraft with two primary AC networks AC1 and AC2 and a network Essential AC have two respectively associated DC networks DC1 and DC2 and a network Essential DC intended to supply the essential loads with a low voltage of 28 V. The networks DC1 and DC2, for their part, make it possible to supply power to non-essential loads that may be shed without affecting the safety of the flight. The DC networks DC1, DC2 and Essential DC are supplied with power, respectively, by the AC networks AC1, AC2 and Essential AC through AC-to-DC converters, respectively TRU 1, TRU 2 and TRU ESS, such as for example transformers associated with rectifiers, often designated by the acronym TRU (Transformer Rectifier Unit) and through contactors, respectively Cdc1, Cdc2 and Cdce. It is possible to associate, with each TRU, a regulator and filters in order to obtain a DC voltage that complies with the prescribed aeronautical standards.

The three DC networks DC1, DC2 and Essential DC are connected to batteries BAT1 and BAT2, which are themselves also low-voltage, by way of a battery network BAT DC and contactors, respectively Cdc1*l*, Cdc2*l* and Cdce*l*. In association with each of the two batteries BAT1 and BAT2, the architecture may comprise a DC network, respectively HOT DC1 and HOT DC1, connected, without any contactor, to its respective battery BAT1 and BAT2. One of the batteries, for example the battery BAT1, may supply power to the network Essential AC through a DC-to-AC converter INV STAT, notably in the event of a fault with the primary generators GEN1 and GEN2. The converter INV STAT is dimensioned so as to supply power to only some of the essential loads supplied with power by the network Essential AC. Its nominal power is far lower than the nominal power of one of the primary generators, typically a few kilowatts. The other battery BAT2 may supply power to the network Essential DC when this is not supplied with power by the converter TRU ESS.

The architecture of FIG. 2 contains the secondary electrical network RES, the two converters CP1 and CP2 and the electrical energy accumulation device BAT-HVDC connected directly to the secondary electrical network RES. Unlike the converter INV STAT, the converter CP2 is dimensioned so as to supply power both to the essential loads connected to the network Essential AC and also to the non-essential loads through the networks AC1 and AC2. The secondary electrical network RES is separate from the low-voltage DC networks described above. It also contains a possibly regenerative load connected to the secondary electrical network RES by way of a DC-to-AC converter. It lastly contains the control module C, the connections of which are not shown. The converter CP2 may be connected to the network AC1 via the contactors K2.1 and C1*l*, to the network AC2 via the contactors K2.1 and C2*l* and to the network Essential AC via the contactors K2.2 and Ce. The converter CP1 may be connected to the network AC1 via the contactor K1.1 and to the network AC2 via the contactor K1.2.

The regulated AC networks AC1, AC2, Essential AC and the regulated DC networks DC1, DC2, Essential DC are conventionally already implemented in commercial aircraft. The secondary electrical network RES, the two converters CP1, CP2 and the electrical energy accumulation device BAT-HVDC may be added to the regulated networks that are already implemented. As an alternative, it is possible to dispense with the regulated DC networks, and notably the networks DC1 and DC2, by connecting the loads conventionally supplied with power by these regulated networks to the new secondary electrical network RES.

In nominal operating mode and in flight, the two generators GEN1 and GEN2 are operational. They each supply power to one of the networks, respectively AC1 and AC2. In a conventional architecture, the primary generators GEN1 and GEN2 are overdimensioned so as to allow power to be supplied to all of the loads of the aircraft. The overdimensioning has to take into account consumption peaks in all of the flight phases in nominal operating mode, that is to say without any faults. Implementing a secondary electrical network RES allows the electrical energy accumulation device BAT-HVDC to supply the required power used during consumption peaks. It is then possible to reduce the nominal power of the primary generators GEN1 and GEN2, which may be dimensioned on the basis of the average power consumed by all of the loads of the aircraft, and no longer on the basis of the maximum power consumed during consumption peaks. In the dimensioning, it is also necessary to take into account fault cases, and notably the case of a fault with an engine, and therefore with one of the generators GEN1 or GEN2. It is possible to use the energy production overcapacity of the generators GEN1 and GEN2 to charge the electrical energy accumulation device BAT-HVDC. To this end, the converter CP1 draws energy either from the network AC1 by closing the contactor K1.1 or from the network AC2 by closing the contactor K1.2. The converter CP1 may be redundant, and it is then possible to draw energy from the two networks AC1 and AC2 at the same time. In the event of a fault with one of the modules of the converter CP1, the other module may continue to draw energy from one of the networks AC1 or AC2.

In flight, in the event of loss of a generator, for example the generator GEN1, the secondary electrical network RES may supply power to the network AC1 through the converter CP2 and the contactors K2.1 and C1*l*. During this fault, it is still possible to draw energy from the network AC2 in order to supply power to the secondary electrical network RES through the converter CP1 and the contactor K1.2. In other words, even in the event of loss of a generator, it is possible not to discharge the electrical energy accumulation device BAT-HVDC while still using the secondary electrical network RES to supply power to one of the primary networks.

More generally, the electrical energy accumulation device BAT-HVDC may be recharged continuously throughout the entire flight. As has been explained above, the primary generators GEN1 and GEN2 are overdimensioned so as to take into account cases of faults with one of the generators. During nominal operation, that is to say without any faults, the primary generators GEN1 and GEN2 are underloaded. Of the order of 30% and 40% of their available power is used, such that there is still between 60% and 70% power available on each of the generators, this being largely sufficient to rapidly recharge the electrical energy accumulation device BAT-HVDC in nominal operating phases, and notably in the cruising phase.

In the event of loss of an engine, the remaining generator has to take over the load of the lost generator. It may therefore be loaded to between 60 and 80%. In this case, there is still a recharging capacity for the electrical energy accumulation device BAT-HVDC of between 20% and 40% of the power of the remaining generator. It is advantageous to dimension the secondary network RES and the electrical energy accumulation device BAT-HVDC so as to replace a primary generator in the event of loss of this generator.

In the event of loss of the second generator GEN2, the contactor C2*l* is closed so as to supply power to the network AC2 via the converter CP2. It is also possible to supply power to the network Essential AC via the converter CP2 and the contactors K2.2 and Ce. It is possible to dimension the electrical energy accumulation device BAT-HVDC in a manner sufficient to dispense with the RAT. Specifically, as has been seen above, when there is a fault with a generator, it is possible to not draw energy from the electrical energy accumulation device BAT-HVDC. The energy that it contains is therefore available when a fault occurs in a second generator when the first one was already faulty.

In the event of a fault with a load connected to one of the primary networks, the fault leading to short-circuiting of the load, the momentary overconsumption on the primary network in question may be covered by the secondary electrical network RES through the converter CP2. This overconsumption occurs between the occurrence of the short circuit and the tripping of protection that isolates the load from the primary network in question. In this fault case, the provision of energy by the secondary electrical network RES makes it possible to limit the current draw at the primary generator supplying power to the primary network in question, and also makes it possible to limit the risk of an overvoltage occurring on the primary network when the load is isolated. Specifically, rapid energy production variations are difficult to manage in the primary generators. To facilitate the rapid provision of energy by the secondary electrical network RES, the converter CP2 is connected to the primary electrical network in question AC1 and/or AC2 and/or Essential AC through a semiconductor-based electronic switch, the state change of which is generally much faster than an electromechanical contactor. Among electronic switches, mention may be made notably of insulated-gate field-effect transistors, commonly designated by the acronym IGBT for: "Insulated Gate Bipolar Transistor", and thyristors. To isolate the secondary electrical network RES and the primary networks, it is possible to place, in series with the electronic switch, a normally closed electromechanical disconnector.

The electrical energy accumulation device BAT-HVDC may also be recharged when the aircraft is on the ground, by a ground supply unit connected to the ground supply outlet EXT PWR 1 through one of the networks AC1 or AC2 by closing the contactor K1.1 or K1.2. When an outlet EXT PWR 2 is present and a suitable ground supply unit is available, it is also possible to recharge the electrical energy accumulation device BAT-HVDC through the ground supply outlet EXT PWR 2.

The wheel motors of the aircraft for moving it in e-taxi mode may be supplied with power by the secondary electrical network RES. During nominal operation, the electrical energy accumulation device BAT-HVDC supplies power to the wheel motors. In the event of a fault with or discharging of the electrical energy accumulation device BAT-HVDC, the e-taxi function may still be provided by way of the primary generators GEN1 and GEN2 driven by the propulsion engines. The generators GEN1 and GEN2 supply power to the networks AC1 and AC2, which in turn supply power to the secondary electrical network RES through the converter CP1, thereby making it possible to supply power to the wheel motors. In other words, even in the event of a fault with the primary device connected to the secondary electrical network RES, specifically the electrical energy accumulation device BAT-HVDC, the e-taxi function remains available.

Unlike the 28 V batteries BAT1 and BAT2 that are intended, in backup mode, to supply power to the 28 VDC loads and a few essential loads through the converter INV STAT, the electrical energy accumulation device BAT-HVDC is able to temporarily supply power to any type of load throughout all of the flight phases and deliver significant instantaneous powers. The electrical energy accumulation device BAT-HVDC is advantageously dimensioned so as to deliver an instantaneous power of the same order of magnitude as that of each of the primary generators GEN1 or GEN2, typically between half and one-and-a-half times the instantaneous power of each of the primary generators GEN1 or GEN2. The duration for which the electrical energy accumulation device BAT-HVDC is able to supply this power depends essentially on the energy and therefore on its size, which is dimensioned on the basis of the loads liable to be supplied with power. In order to optimize the mass of the electrical energy accumulation device BAT-HVDC and that of the converters associated with the secondary network RES, it is advantageous to maximize the number of loads liable to be supplied with power by the secondary network RES and to use it during all of the flight phases of the aircraft. Unlike 28 VDC batteries intended essentially for backup mode, it is advantageous to use the secondary network RES and the electrical energy accumulation device BAT-HVDC during all of the operating phases, both on the ground and in flight, and to allow the provision of energy in nominal mode and in backup mode.

Figure 3:
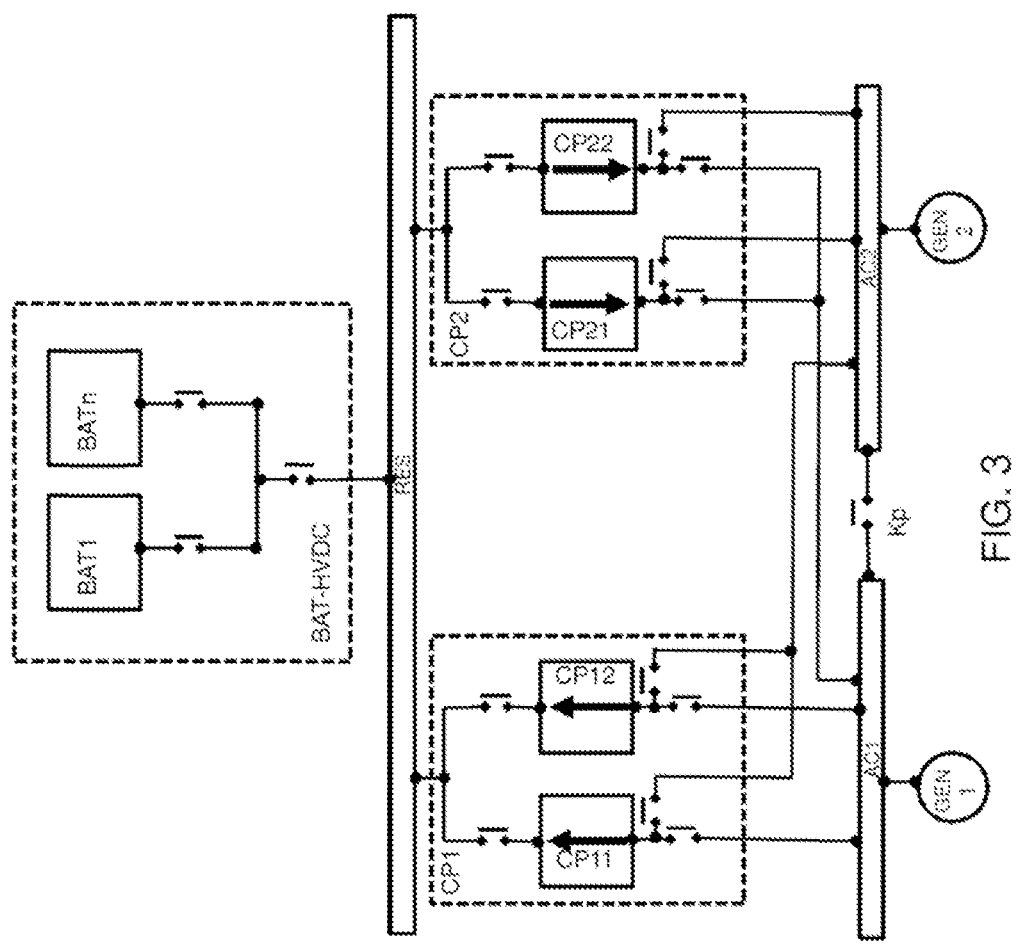
FIGS. 3 and 4 show examples of an electrical architecture according to the invention in which some devices are redundant.

FIG. 3 shows one example of an electrical architecture according to the invention in which the converters CP1 and CP2 are redundant. The electrical energy accumulation device BAT-HVDC is additionally also redundant. In the context of the invention, it is of course possible for only one of the converters CP1 or CP2 to be redundant, or for only the electrical energy accumulation device BAT-HVDC to be redundant. The secondary electrical network RES shown in FIG. 3 is a DC network. As an alternative, the secondary electrical network RES may be an AC network. The converter CP1 comprises two modules CP11 and CP12 able to operate in parallel so as to supply power to the secondary electrical network RES. In this example, the electrical architecture comprises two primary AC networks AC1 and AC2. The two modules CP11 and CP12 are AC-to-DC converters. They may be identical. The converter CP2 comprises two modules CP21 and CP22 able to operate in parallel so as to draw energy from the secondary electrical network RES and both supply power to the two networks AC1 and AC2 by way of a set of contactors. The two modules CP21 and CP22 are DC-to-AC converters. The electrical energy accumulation device BAT-HVDC comprises a plurality of accumulation modules, denoted BAT1 to BATn, able to operate in parallel. If one of the accumulation modules is faulty, this may be disconnected by way of a contactor that is specific thereto.

Figure 4:
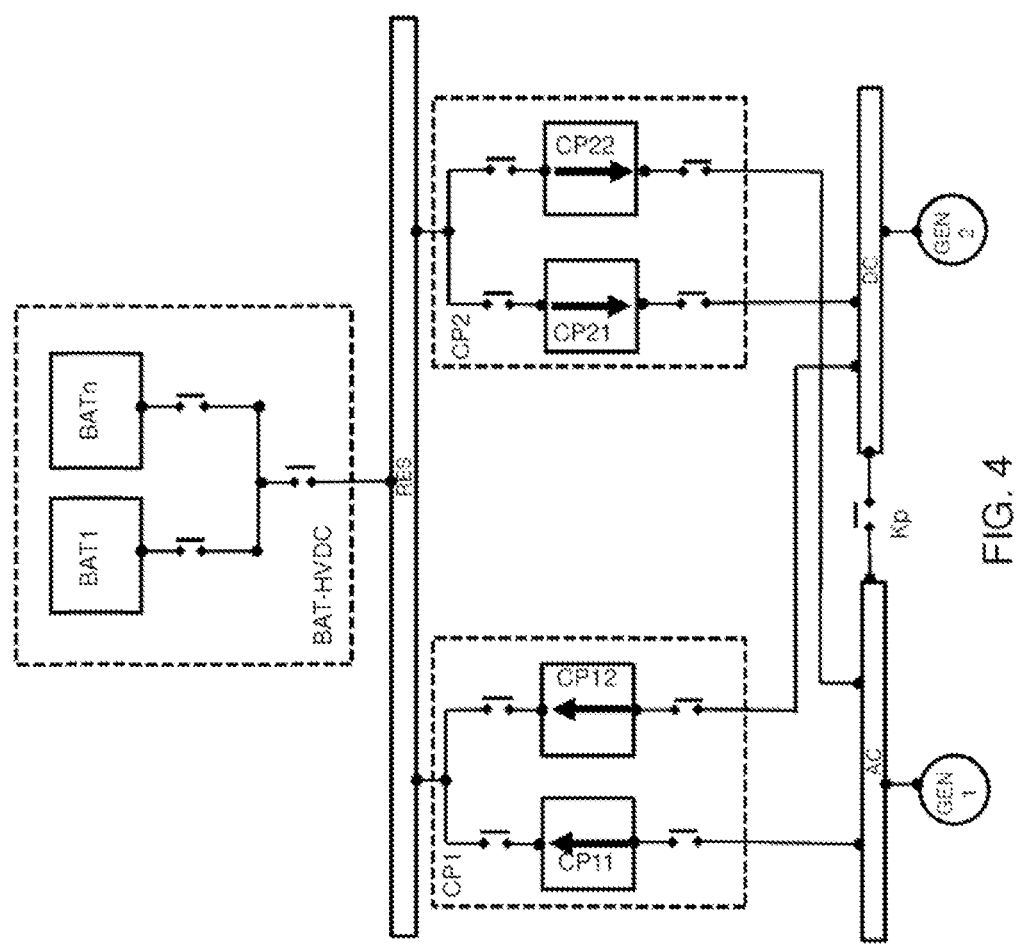

FIG. 4 shows another example of an electrical architecture according to the invention in which the converters CP1 and CP2 are redundant. This example contains the redundant electrical energy accumulation device BAT-HVDC from FIG. 3. In the example of FIG. 4, the electrical architecture comprises two primary networks AC and DC. The network AC is an AC network and the network DC is a DC network. The module CP11 is an AC-to-DC converter and the module CP12 is a DC-to-DC converter. The converter CP2 comprises two modules CP21 and CP22 able to operate in parallel so as to draw energy from the secondary electrical network RES and supply power respectively to each of the primary networks DC and AC. The module CP21 is a DC-to-DC converter and the module CP22 is a DC-to-AC converter.

The invention claimed is:

1. An electrical architecture of an aircraft comprising:
a plurality of primary generators each associated with a propulsion engine of the aircraft, each of the primary generators being configured so as to deliver a nominal power,
a plurality of primary electrical networks each associated with a primary generator in nominal operating mode and operating at a first nominal voltage,
a single-part secondary electrical network operating in a voltage range whose minimum value is at least equal to twice a value of the first nominal voltage,
an electrical energy accumulation device connected directly to the secondary electrical network,
a first electrical energy converter arranged between the secondary electrical network and a first of the primary electrical networks, allowing energy to be transferred from the first of the primary electrical networks to the secondary electrical network, the first electrical energy converter being intended to supply electrical energy to the electrical energy accumulation device in nominal operating mode, a second electrical energy converter arranged between the secondary electrical network and a second of the primary electrical networks, allowing energy to be transferred, in nominal operating mode, from the secondary electrical network to the second of the primary electrical networks,
the electrical energy accumulation device and the second electrical energy converter being configured so as to allow the second of the primary electrical networks to be supplied with a power at least equal to half the nominal power of one of the primary generators.

2. The electrical architecture according to claim 1, further comprising:
at least one regulated low-voltage DC network whose nominal voltage is substantially between 24 and 30 V, the low-voltage DC network being separate from the single-part secondary electrical network,
at least one battery connected to the low-voltage DC network,
a third electrical energy converter for supplying power to the low-voltage DC network from one of the primary electrical networks, a fourth electrical energy converter for supplying power to one of the primary electrical networks to which the essential loads of the aircraft are connected.

3. The electrical architecture according to claim 1, wherein the primary electrical networks are regulated and wherein the secondary electrical network is a DC voltage network whose voltage is set by the electrical energy accumulation device.

4. The electrical architecture according to claim 3, wherein the single-part secondary electrical network is configured so as to operate, in nominal operating mode, at an operating voltage whose value may vary within a ratio from 1 to 3.

5. The electrical architecture according to claim 1, wherein the first electrical energy converter has a nominal power lower than the nominal power of the second electrical energy converter.

6. The electrical architecture according to claim 1, further comprising a regenerative load connected to the secondary electrical network by way of a bidirectional converter without passing via one of the primary electrical networks.

7. The electrical architecture according to claim 1, further comprising at least one electric generator unit independent of any propulsion engine of the aircraft and connected to the secondary electrical network without passing via one of the primary electrical networks.

8. The electrical architecture according to claim 1, further comprising a domestic cabin electrical network connected to the secondary electrical network by way of a third electrical energy converter without passing via one of the primary electrical networks.

9. The electrical architecture according to claim 1, further comprising an essential electrical network for supplying power to essential loads of the aircraft, the second electrical energy converter being able to supply power to the essential electrical network.

10. The electrical architecture according to claim 1, further comprising an electrical power distribution system and a control module for controlling the secondary electrical network, exchanging information in order to drive the electrical energy converters.

11. The electrical architecture according to claim 1, wherein the first and second electrical energy converters each comprise a transformer having reinforced insulation.

12. The electrical architecture according to claim 1, wherein the second electrical energy converter is connected to a second primary electrical network through a semiconductor-based electronic switch, allowing the single-part secondary electrical network to supply a short-circuit current to a load connected to the second primary electrical network.

* * * * *